United States Patent
Chu et al.

(10) Patent No.: US 12,463,678 B2
(45) Date of Patent: *Nov. 4, 2025

(54) INQUIRER-SIDE CIRCUIT SUPPORTING ASYMMETRY DATA MODE

(71) Applicant: Realtek Semiconductor Corp., Hsinchu (TW)

(72) Inventors: Yuan-Jih Chu, Hsinchu (TW); Yao-Chun Chuang, Hsinchu (TW); Ching-Yen Lee, Hsinchu (TW); Ming Hsuan Tsai, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 14 days.

This patent is subject to a terminal disclaimer.

(21) Appl. No.: 18/527,684

(22) Filed: Dec. 4, 2023

(65) Prior Publication Data
US 2024/0195449 A1 Jun. 13, 2024

Related U.S. Application Data

(60) Provisional application No. 63/430,666, filed on Dec. 7, 2022.

(30) Foreign Application Priority Data

Nov. 13, 2023 (TW) ................................. 112143733

(51) Int. Cl.
*H04B 1/40* (2015.01)
*H04B 3/23* (2006.01)

(52) U.S. Cl.
CPC ................ *H04B 1/40* (2013.01); *H04B 3/23* (2013.01)

(58) Field of Classification Search
CPC . H04B 1/38; H04B 1/40; H04B 1/401; H04B 1/58; H04B 3/23; H04B 3/231; H04L 5/14; H04L 5/16

(Continued)

(56) References Cited

U.S. PATENT DOCUMENTS 11,552,776 B1 * 1/2023 Sedarat ................ H04L 12/413
2002/0085510 A1 * 7/2002 Chan ........................ H04B 3/23
370/286

(Continued)

FOREIGN PATENT DOCUMENTS

CN 112640356 A 4/2021

OTHER PUBLICATIONS

Taiwanese Office Action and Search Report for Taiwanese Application No. 112143732, dated Mar. 12, 2024, with English translation.

(Continued)

*Primary Examiner* — Young T. Tse
(74) *Attorney, Agent, or Firm* — Birch, Stewart, Kolasch & Birch, LLP

(57) ABSTRACT

An inquirer-side circuit of an automotive Ethernet system includes: a hybrid circuit arranged to operably conduct data communication with a respondent-side circuit through an MDI circuit; a transmitting circuit coupled with a hybrid circuit and arranged to operably generate and provide a transmission signal to the hybrid circuit; a receiving circuit coupled with the hybrid circuit and arranged to operably receive and parse a received signal transmitted from the hybrid circuit to generate a data signal; a processing circuit coupled with the receiving circuit and arranged to operably process the data signal; a physical coding sublayer circuit coupled with the processing circuit and arranged to operably conduct a physical coding operation to control the operations of the transmitting circuit; and an echo cancellation circuit coupled between the transmitting circuit and the receiving circuit, and arranged to operably generate an echo cancellation signal.

9 Claims, 4 Drawing Sheets

(58) Field of Classification Search
USPC ........ 375/219, 220, 257, 256; 370/282, 286, 370/293, 298; 455/73, 76, 88
See application file for complete search history.

(56) References Cited

U.S. PATENT DOCUMENTS

| | | | |
|---|---|---|---|
| 2015/0326348 A1* | 11/2015 | Shen ..................... | H04L 1/0041 |
| | | | 714/776 |
| 2019/0149371 A1* | 5/2019 | Riesco-Prieto ... | H03M 13/3723 |
| | | | 375/222 |
| 2020/0083974 A1 | 3/2020 | Dalmia | |
| 2023/0188310 A1* | 6/2023 | Wu ........................ | H04B 3/23 |
| | | | 370/295 |
| 2024/0080173 A1* | 3/2024 | Li ......................... | H04L 5/1461 |
| 2024/0195449 A1* | 6/2024 | Chu ........................ | H04B 1/40 |

OTHER PUBLICATIONS

Taiwanese Office Action and Search Report for Taiwanese Application No. 112143733, dated Mar. 21, 2024, with English translation.
Taiwanese Notice of Allowance for Taiwanese Application No. 112143733, dated Jun. 27, 2024, with English translation.
U.S. Office Action for U.S. Appl. No. 18/528,163, dated Apr. 24, 2025.

* cited by examiner

INQUIRER-SIDE CIRCUIT SUPPORTING ASYMMETRY DATA MODE

CROSS-REFERENCE TO RELATED APPLICATIONS

This application claims the benefit of priority to U.S. Provisional Application Ser. No. 63/430,666, filed on Dec. 7, 2022; the entirety of which is incorporated herein by reference for all purposes.

This application claims the benefit of priority to patent application Ser. No. 11/214,3733, filed in Taiwan on Nov. 13, 2023; the entirety of which is incorporated herein by reference for all purposes.

BACKGROUND

The disclosure generally relates to automotive Ethernet communication technologies and, more particularly, to an inquirer-side circuit supporting an asymmetry data mode.

As the technology advances, the application of automotive Ethernet communication technology has become increasingly widespread. The number of Ethernet communication devices installed in vehicles, such as various Ethernet communication chips, is also growing. According to the specifications of automotive Ethernet communication protocols, a full-duplex transmission mechanism must be adopted between two devices that adopt automotive Ethernet communication protocols for various data communications.

As is well known in the art, the full-duplex transmission mechanism requires more power consumption. However, for many vehicles, especially electric vehicles, the power usage efficiency of vehicle devices is a very important performance indicator. Therefore, if the power consumption of the automotive Ethernet communication devices cannot be effectively reduced, it will inevitably hinder the development of the automotive Ethernet communication technologies.

SUMMARY

An example embodiment of an inquirer-side circuit is disclosed, comprising: a hybrid circuit arranged to operably conduct data communication with a respondent-side circuit through an MDI circuit; a transmitting circuit coupled with the hybrid circuit and arranged to operably generate and transmit a transmission signal to the hybrid circuit; a receiving circuit coupled with the hybrid circuit and arranged to operably receive and parse a received signal transmitted from the hybrid circuit to generate a data signal; a processing circuit coupled with the receiving circuit and arranged to operably process the data signal; a physical coding sublayer circuit coupled with the processing circuit and arranged to operably conduct a physical coding operation, so as to control operations of the transmitting circuit; and an echo cancellation circuit coupled between the transmitting circuit and the receiving circuit and arranged to operably generate an echo cancellation signal.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
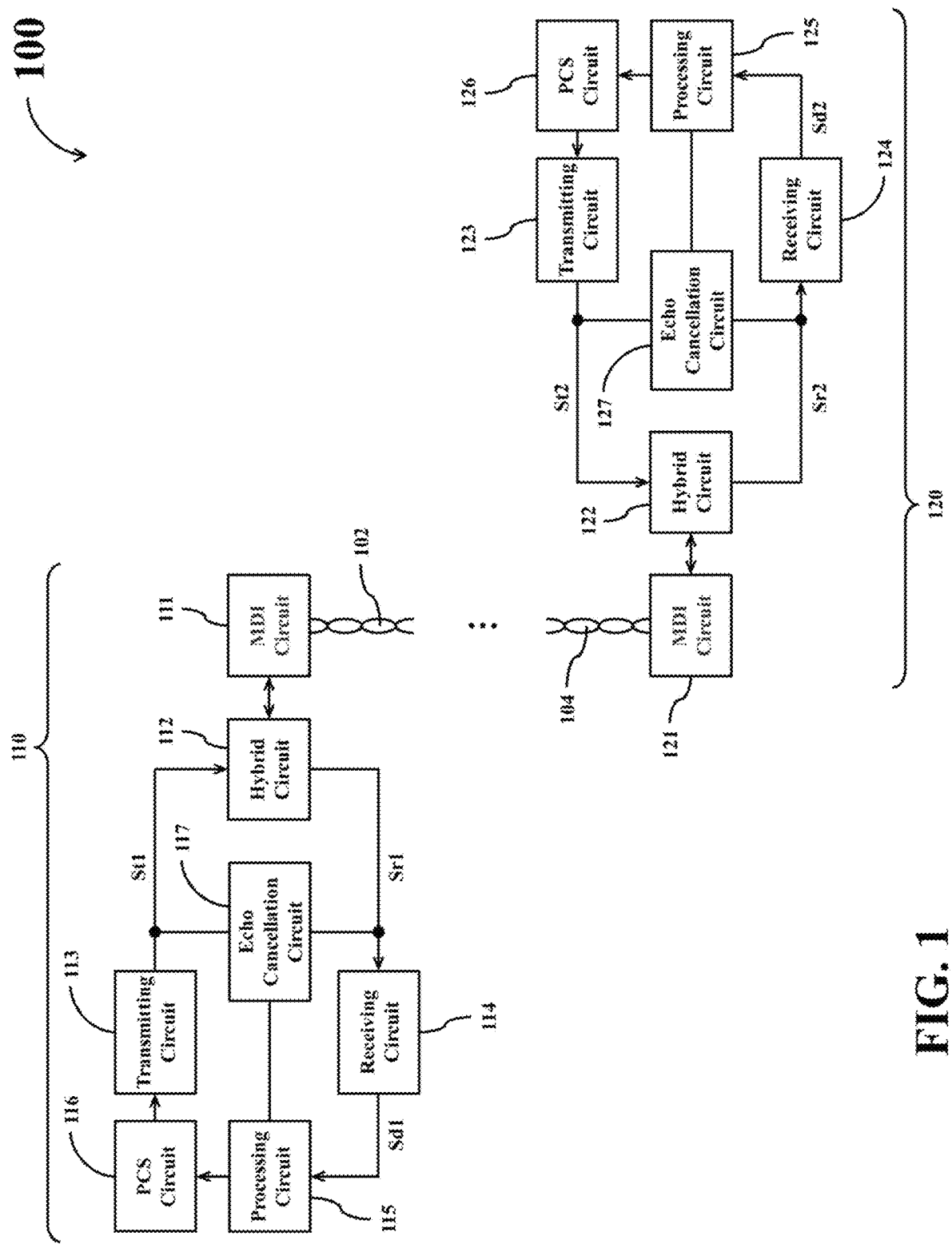
FIG. 1 shows a simplified functional block diagram of an automotive Ethernet system according to one embodiment of the present disclosure.

FIG. 1 shows a simplified functional block diagram of an automotive Ethernet system 100 according to one embodiment of the present disclosure. The automotive Ethernet system 100 comprises an inquirer-side circuit 110 and a respondent-side circuit 120. Various data communications may be conducted between the inquirer-side circuit 110 and the respondent-side circuit 120.

As shown in FIG. 1, the inquirer-side circuit 110 comprises a medium dependent interface (MDI) circuit 111, a hybrid circuit 112, a transmitting circuit 113, a receiving circuit 114, a processing circuit 115, a physical coding sublayer (PCS) 116, and an echo cancellation circuit 117. The respondent-side circuit 120 comprises a medium dependent interface (MDI) circuit 121, a hybrid circuit 122, a transmitting circuit 123, a receiving circuit 124, a processing circuit 125, a physical coding sublayer (PCS) 126, and an echo cancellation circuit 127.

In the inquirer-side circuit 110, the MDI circuit 111 is arranged to operably couple with a twisted pair 102. The MDI circuit 111 is also arranged to operably transmit signals to the respondent-side circuit 120 through the twisted pair 102, to operably receive signals transmitted from the respondent-side circuit 120 through the twisted pair 102. The hybrid circuit 112 is arranged to operably couple with the MDI circuit 111, so as to conduct various data communication with the respondent-side circuit 120 through the MDI circuit 111.

The transmitting circuit 113 is coupled with the hybrid circuit 112 and arranged to operably generate and transmit a transmission signal St1 to the hybrid circuit 112. The receiving circuit 114 is coupled with the hybrid circuit 112 and arranged to operably receive and parse a received signal Sr1 transmitted from the hybrid circuit 112 so as to generate a data signal Sd1.

The processing circuit 115 is coupled with the receiving circuit 114 and arranged to operably process the data signal Sd1 and to operably control the operations of the inquirer-side circuit 110. The physical coding sublayer circuit 116 is coupled with the processing circuit 115 and arranged to operably conduct a physical coding operation based on the instructions of the processing circuit 115, so as to control the operations of the transmitting circuit 113.

The echo cancellation circuit 117 is coupled between the output terminal of the transmitting circuit 113 and the input terminal of the receiving circuit 114, and arranged to operably generate an echo cancellation signal according to the transmission signal St1 so as to eliminate or mitigate the echo components in the received signal Sr1. As is well-known in the art, when the inquirer-side circuit 110 operates in the full duplex mode, the transmitting circuit 113 and the receiving circuit 114 would operate at the same time. In this situation, the received signal Sr1 transmitted from the hybrid circuit 112 to the receiving circuit 114 may include echo components corresponding to the transmission signal St1 generated by the transmitting circuit 113. Accordingly, when the transmitting circuit 113 and the receiving circuit 114 operate simultaneously, it is required to utilize the echo cancellation circuit 117 to generate echo cancellation signals to eliminate or mitigate the echo components in the received signal Sr1, thereby increasing the correctness of the signals received by the receiving circuit 114.

In the respondent-side circuit 120, the MDI circuit 121 is arranged to operably couple with a twisted pair 104. The MDI circuit 121 is also arranged to operably transmit signals to the inquirer-side circuit 110 through the twisted pair 104, or to operably receive signals transmitted from the inquirer-side circuit 110 through the twisted pair 104. In one embodiment, the aforementioned twisted pair 102 and twisted pair 104 are the same twisted pair. In another embodiment, the aforementioned twisted pair 104 is indirectly connected to the twisted pair 102 through an intermediate circuit (e.g., a connector, a hub, a switch, etc.). The hybrid circuit 122 is arranged to operably couple with the MDI circuit 121, so as to conduct various data communication with the inquirer-side circuit 110 through the MDI circuit 121.

The transmitting circuit 123 is coupled with the hybrid circuit 122 and arranged to operably generate and transmit a transmission signal St2 to the hybrid circuit 122. The receiving circuit 124 is coupled with the hybrid circuit 122 and arranged to operably receive and parse a received signal Sr2 transmitted from the hybrid circuit 122 so as to generate a data signal Sd2.

The processing circuit 125 is coupled with the receiving circuit 124 and arranged to operably process the data signal Sd2 and to operably control the operations of the respondent-side circuit 120. The physical coding sublayer circuit 126 is coupled with the processing circuit 125 and arranged to operably conduct a physical coding operation based on the instructions of the processing circuit 125, so as to control the operations of the transmitting circuit 123.

The echo cancellation circuit 127 is coupled with the output terminal of the transmitting circuit 123 and the input terminal of the receiving circuit 124, and arranged to operably generate an echo cancellation signal according to the transmission signal St2 so as to eliminate or mitigate the echo components in the received signal Sr2. Similarly, when the respondent-side circuit 120 operates in the full duplex mode, the transmitting circuit 123 and the receiving circuit 124 would operate simultaneously. In this situation, the received signal Sr2 transmitted from the hybrid circuit 122 to the receiving circuit 124 may include echo components corresponding to the transmission signal St2 generated by the transmitting circuit 123. Accordingly, when the transmitting circuit 123 and the receiving circuit 124 operate simultaneously, it is required to utilize the echo cancellation circuit 127 to generate echo cancellation signals to eliminate or mitigate the echo components in the received signal Sr2, thereby increasing the correctness of the signals received by the receiving circuit 124.

Different functional blocks in the aforementioned inquirer-side circuit 110 may be respectively realized with separate circuits, or may be integrated into a single circuit or a single device. Similarly, different functional blocks in the aforementioned respondent-side circuit 120 may be respectively realized with separate circuits, or may be integrated into a single circuit or a single device. For sake of brevity, other circuits, components, and connection relationship thereof are omitted in FIG. 1.

In practical applications, there are various combinations of roles acted by the inquirer-side circuit 110 and the respondent-side circuit 120. For example, one of the inquirer-side circuit 110 and the respondent-side circuit 120 may be an automotive central controller or a partial circuit of the aforementioned automotive central controller; while another one of the inquirer-side circuit 110 and the respondent-side circuit 120 may be may be a sensing device for use in a vehicle (e.g., a tire pressure detector, a dash cam, a reverse radar, a voice detector, a physiological feature sensor, an air quality sensor, a temperature sensor, etc.), an actuator circuit for use in a vehicle (e.g., a throttle, a brake, a door, a wiper, a rearview mirror, a sunroof, etc.), a partial circuit of the aforementioned sensing device, or a partial circuit of the aforementioned actuator circuit.

In the automotive Ethernet system 100, the inquirer-side circuit 110 is arranged to operably operate in an asymmetry data mode, which will be described in the later paragraphs of this disclosure. If the respondent-side circuit 120 is also capable of supporting the asymmetry data mode proposed in this disclosure, then the inquirer-side circuit 110 and the respondent-side circuit 120 may adopt the asymmetry data mode proposed in this disclosure to gain numerous technical advantages when conducting data communication with each other.

However, whether the respondent-side circuit 120 supports the asymmetry data mode proposed in this disclosure or not, is not decided by the manufacturer of the inquirer-side circuit 110. For example, in some application scenarios, the respondent-side circuit 120 in the automotive Ethernet system 100 is configured to be capable of supporting the asymmetry data mode proposed in this disclosure, but various reasons (e.g., circuit malfunction, component repairing, component replacement, component update, etc.) may cause the respondent-side circuit 120 to be unable to support the asymmetry data mode in a later stage. For another example, in other application scenarios, the respondent-side circuit 120 in the automotive Ethernet system 100 is configured to be unable to support the asymmetry data mode proposed in this disclosure, but various reasons (e.g., component replacement, component update, etc.) may render the respondent-side circuit 120 to become capable of supporting the asymmetry data mode in a later stage.

The inquirer-side circuit 110 may adjust the way of conducting data communication with the respondent-side circuit 120 depends on the situation of the respondent-side circuit 120. To achieve this purpose, the inquirer-side circuit 110 may dynamically inspect whether or not the respondent-side circuit 120 supports the asymmetry data mode proposed in this disclosure.

Figure 2:
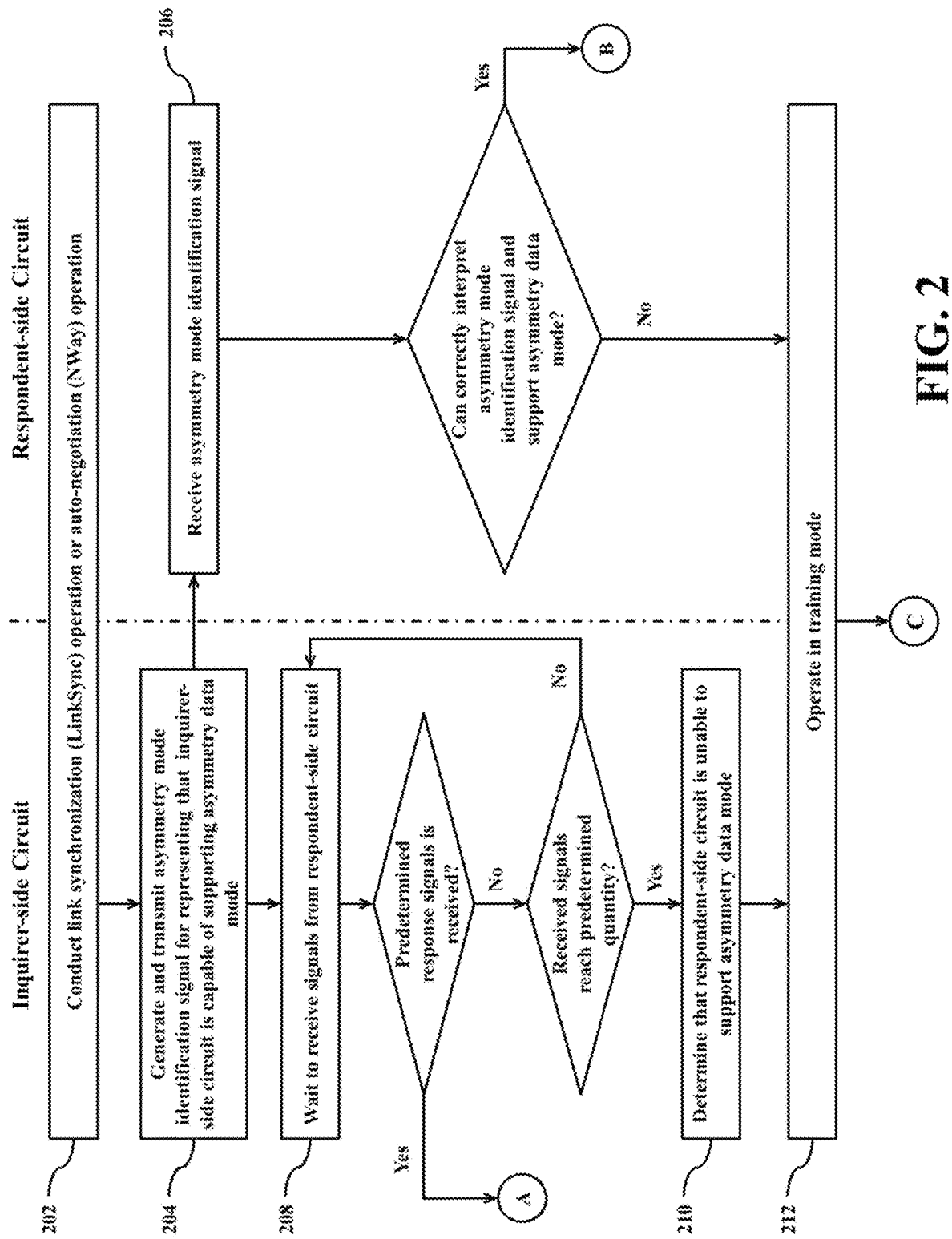
FIGS. 2~3 collectively show a simplified flowchart of a data communication method adopted by the automotive Ethernet system according to one embodiment of the present disclosure.
Figure 3:
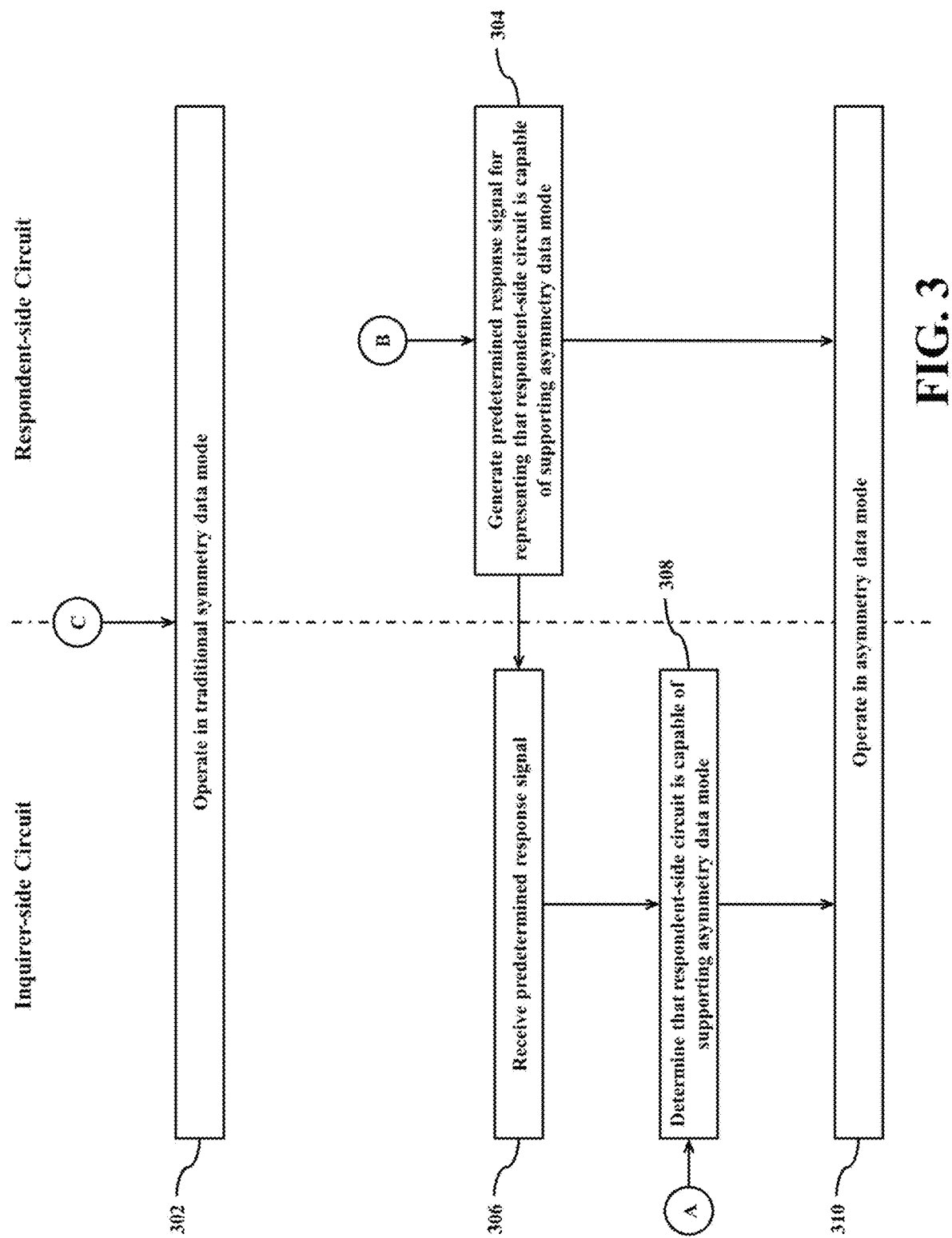
Figure 4:
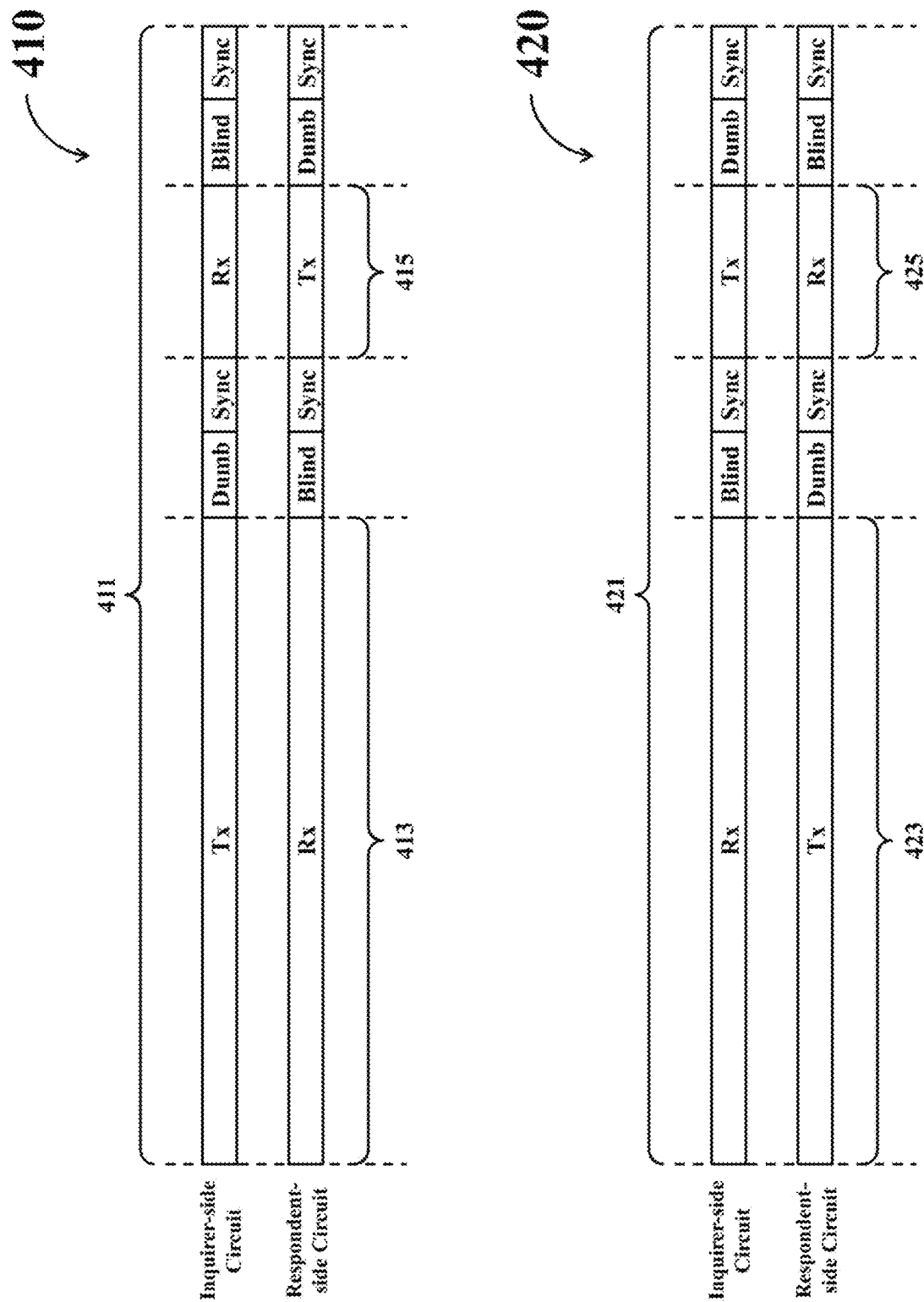
FIG. 4 shows simplified timing diagrams of an asymmetry data mode according to different embodiments of the present disclosure.

The operations of the automotive Ethernet system 100 will be further described in the following by reference to FIG. 2 through FIG. 4. FIGS. 2~3 collectively show a simplified flowchart of a data communication method adopted by the automotive Ethernet system 100 according to one embodiment of the present disclosure. FIG. 4 shows simplified timing diagrams of an asymmetry data mode according to different embodiments of the present disclosure.

In the flowchart of FIGS. 2~3, operations within a column under the name of a specific device are operations to be performed by the specific device. For example, operations within a column under the label "inquirer-side circuit" are operations to be performed by the inquirer-side circuit 110; and operations within a column under the label "respondent-side circuit" are operations to be performed by the respondent-side circuit 120.

In order to establish an Ethernet link between the inquirer-side circuit 110 and the respondent-side circuit 120, the inquirer-side circuit 110 and the respondent-side circuit 120 may conduct a handshake procedure to exchange information and/or parameters required for establishing the Ethernet link.

In this situation, the inquirer-side circuit 110 and the respondent-side circuit 120 perform the operation 202 of FIG. 2 to begin conducting a link synchronization (LinkSync) operation or an auto-negotiation (a.k.a. NWay) operation with each other. In general, the inquirer-side circuit 110 and the respondent-side circuit 120 only need to conduct one of the link synchronization operation and the auto-negotiation operation in the operation 202. The manufacturer of the automotive Ethernet system 100 may pre-configure whether the inquirer-side circuit 110 and the respondent-side circuit 120 should conduct either the link synchronization operation or the auto-negotiation operation.

When conducting the link synchronization operation or the auto-negotiation operation, the transmitting circuit 113 of the inquirer-side circuit 110 transmits handshake signals complying with the automotive Ethernet communication protocol to the respondent-side circuit 120, and the transmitting circuit 123 of the respondent-side circuit 120 transmits handshake signals complying with the automotive Ethernet communication protocol to the inquirer-side circuit 110. On the other hand, the receiving circuit 114 of the inquirer-side circuit 110 would receive handshake signals transmitted from the respondent-side circuit 120, and the receiving circuit 124 of the respondent-side circuit 120 would receive handshake signals transmitted from the inquirer-side circuit 110.

As described previously, the inquirer-side circuit 110 may adjust the way of conducting data communication with the respondent-side circuit 120 depends on the situation of the respondent-side circuit 120.

In this embodiment, in order to confirm whether the respondent-side circuit 120 supports the asymmetry data mode proposed in this disclosure or not, the inquirer-side circuit 110 performs the operation 204 before entering a training mode after completing the link synchronization operation or the auto-negotiation operation.

In the operation 204, the physical coding sublayer circuit 116 controls the transmitting circuit 113 to generate an asymmetry mode identification signal for representing that the inquirer-side circuit 110 is capable of supporting the asymmetry data mode proposed in this disclosure. In the operation 204, the transmitting circuit 113 also transmits the asymmetry mode identification signal to the respondent-side circuit 120 through the hybrid circuit 112 and the MDI circuit 111.

The aforementioned asymmetry mode identification signal may be realized with a signal having a predetermined pattern or a predetermined format. Alternatively, the aforementioned asymmetry mode identification signal may be realized with a signal containing a predetermined value, a predetermined random number, a predetermined flag, and/or a predetermined identification data.

Then, the respondent-side circuit 120 performs the operation 206, and the inquirer-side circuit 110 performs the operation 208.

In the operation 206, the receiving circuit 124 of the respondent-side circuit 120 receives the asymmetry mode identification signal transmitted from the inquirer-side circuit 110 through the MDI circuit 121 and the hybrid circuit 122.

If the respondent-side circuit 120 is capable of supporting the asymmetry data mode proposed in this disclosure, then the receiving circuit 124 should be able to correctly interpret the asymmetry mode identification signal transmitted from the inquirer-side circuit 110. In this situation, the processing circuit 125 of the respondent-side circuit 120 may perform the operation 304 of FIG. 3. In other words, if the respondent-side circuit 120 can correctly interpret the asymmetry mode identification signal transmitted from the inquirer-side circuit 110 and support the asymmetry data mode proposed in this disclosure, then the processing circuit 125 will perform the operation 304 of FIG. 3. In the operation 304, the physical coding sublayer circuit 126 controls the transmitting circuit 123 to generate a predetermined response signal for representing that the respondent-side circuit 120 is capable of supporting the asymmetry data mode proposed in this disclosure.

The aforementioned predetermined response signal may be realized with a signal having a predetermined pattern or a predetermined format. Alternatively, the aforementioned predetermined response signal may be realized with a signal containing a predetermined target value, a predetermined target flag, and/or a predetermined target data.

Additionally, in the operation 304, the transmitting circuit 123 may also transmit the predetermined response signal to the inquirer-side circuit 110 through the hybrid circuit 122 and the MDI circuit 121.

On the contrary, if the receiving circuit 124 is unable to interpret the asymmetry mode identification signal transmitted from the inquirer-side circuit 110 or the respondent-side circuit 120 is unable to support the asymmetry data mode proposed in this disclosure, then the processing circuit 125 of the respondent-side circuit 120 performs the operation 212 of FIG. 2.

On the other hand, as shown in FIG. 2, the inquirer-side circuit 110 performs the operation 208 after transmitting the asymmetry mode identification signal to the respondent-side circuit 120.

In the operation 208, the receiving circuit 114 of the inquirer-side circuit 110 will wait to receive signals transmitted from the respondent-side circuit 120. In addition, the inquirer-side circuit 110 will also determine whether the respondent-side circuit 120 supports the asymmetry data mode proposed in this disclosure or not according to the subsequent signals transmitted from the respondent-side circuit 120.

After the inquirer-side circuit 110 and the respondent-side circuit 120 complete the link synchronization operation or the auto-negotiation operation, if the receiving circuit 114 receives the aforementioned predetermined response signal transmitted from the respondent-side circuit 120 before the inquirer-side circuit 110 begins to enter a training mode with the respondent-side circuit 120, then the processing circuit 115 would determine that the respondent-side circuit 120 is capable of supporting the asymmetry data mode proposed in this disclosure.

In this embodiment, for example, if the respondent-side circuit 120 transmits the aforementioned predetermined response signal to the inquirer-side circuit 110 within a predetermined time length after the aforementioned asymmetry mode identification signal is transmitted from the inquirer-side circuit 110 to the respondent-side circuit 120, then the processing circuit 115 of the inquirer-side circuit 110 may determine that the respondent-side circuit 120 is capable of supporting the asymmetry data mode proposed in this disclosure. The aforementioned predetermined time length may be a time length required for receiving a predetermined quantity of signals.

On the contrary, if the respondent-side circuit 120 does not transmit the predetermined response signal to the inquirer-side circuit 110 within the aforementioned predetermined time length, then the processing circuit 115 of the inquirer-side circuit 110 may determine that the respondent-side circuit 120 in unable to support the asymmetry data mode proposed in this disclosure.

For example, the processing circuit 115 may begin to count the quantity of subsequent signals transmitted from the respondent-side circuit 120 after the transmitting circuit 113 transmits an asymmetry mode identification signal to the respondent-side circuit 120. If the receiving circuit 114 receives a predetermined response signal transmitted from the respondent-side circuit 120 before the signals transmitted from the respondent-side circuit 120 reaches a predetermined quantity, then the processing circuit 115 performs the operation 310 of FIG. 3 to determine that the respondent-side circuit 120 is capable of supporting the asymmetry data mode proposed in this disclosure.

On the contrary, if the receiving circuit 114 has received a predetermined quantity of signals from the respondent-side circuit 120, but has not yet received a predetermined response signal transmitted from the respondent-side circuit 120, then the processing circuit 115 will perform the operation 210 of FIG. 2 to determine that the respondent-side circuit 120 in unable to support the asymmetry data mode proposed in this disclosure, and then perform the operation 212.

In practice, the aforementioned predetermined time length may be modified to be a fixed time length, such as 0.5 second, 1.0 second, 1.5 seconds, 2.0 seconds, 2.5 seconds, 3.0 seconds, or the like.

In the operation 212, the inquirer-side circuit 110 and the respondent-side circuit 120 operate in a training mode to conduct a signal training operation. In other words, the inquirer-side circuit 110 transmits the asymmetry mode identification signal to the respondent-side circuit 120 before the inquirer-side circuit 110 and the respondent-side circuit 120 conduct the signal training operation. In operations, one of the inquirer-side circuit 110 and the respondent-side circuit 120 may act as a master device, while the other one may act as a slave device. In the operation 212, the master device transmits training data signals to the slave device, and the slave device performs a timing recovery operation based on the training data signals transmitted from the master device, to calibrate the frequency and/or the phase of the internal working clock of the slave device, so that the working clock of the slave device can be synchronized with the working clock of the master device.

In other words, the signal training operation conducted by the inquirer-side circuit 110 and the respondent-side circuit 120 in the operation 212 can enable the working clocks between the inquirer-side circuit 110 and the respondent-side circuit 120 to be synchronized.

As shown in FIG. 3, after the inquirer-side circuit 110 and the respondent-side circuit 120 complete the signal training operation in the operation 212, the inquirer-side circuit 110 and the respondent-side circuit 120 would perform the operation 302 to operate in a traditional symmetry data mode. According to the specifications of the traditional automotive Ethernet communication protocol, the aforementioned symmetry data mode is a full duplex mode.

In other words, the inquirer-side circuit 110 can conduct data transmission and data reception at the same time in the operation 302. Similarly, the respondent-side circuit 120 can conduct data transmission and data reception at the same time in the operation 302. Accordingly, the inquirer-side circuit 110 and the respondent-side circuit 120 can simultaneously transmit data to each other and receive data from each other.

As described previously, if the respondent-side circuit 120 can correctly interpret the asymmetry mode identification signal transmitted from the inquirer-side circuit 110 and support the asymmetry data mode proposed in this disclosure, then the respondent-side circuit 120 would perform the operation 304 of FIG. 3 to transmit a predetermined response signal for representing that the respondent-side circuit 120 is capable of supporting the asymmetry data mode proposed to the inquirer-side circuit 110.

In this situation, the receiving circuit 114 of the inquirer-side circuit 110 performs the operation 306 to receive the predetermined response signal transmitted from the respondent-side circuit 120 through the MDI circuit 111 and the hybrid circuit 112.

It can be appreciated from the foregoing elaborations that if the receiving circuit 114 receives the predetermined response signal transmitted from the respondent-side circuit 120 within a predetermined time length after the inquirer-side circuit 110 transmits the asymmetry mode identification signal, the processing circuit 115 of the inquirer-side circuit 110 will perform the operation 308 to determine that the respondent-side circuit 120 is capable of supporting the asymmetry data mode proposed in this disclosure and then proceed to the operation 310.

In the operation 310, the inquirer-side circuit 110 may, under control of the processing circuit 115, cooperate with the respondent-side circuit 120 to operate in the asymmetry data mode proposed in this disclosure, so as to communicate various data with the respondent-side circuit 120. That is, the processing circuit 115 would control the inquirer-side circuit 110 to operate in the asymmetry data mode only if the processing circuit 115 determines that the respondent-side circuit 120 is capable of supporting the asymmetry data mode. In other words, the respondent-side circuit 120 transmits the predetermined response signal to the inquirer-side circuit 110 after the inquirer-side circuit 110 and the respondent-side circuit 120 complete the link synchronization operation or the auto-negotiation operation.

In some embodiments, between the operation 308 and the operation 310, the inquirer-side circuit 110 and the respondent-side circuit 120 may conduct a signal training operation with each other as that described in the aforementioned operation 212, so that the working clocks between the inquirer-side circuit 110 and the respondent-side circuit 120 can be synchronized with each other. In this situation, the processing circuit 115 controls the inquirer-side circuit 110 to conduct a signal training operation with the respondent-side circuit 120.

Please note that the asymmetry data mode proposed in this disclosure is not a data mode specified in the traditional automotive Ethernet communication protocol, so it is not a full duplex mode.

For example, FIG. 4 shows simplified timing diagrams of an asymmetry data mode according to two different embodiments of the present disclosure. In FIG. 4, a timing diagram of a first asymmetry data mode 410 and a timing diagram of a second asymmetry data mode 420 are depicted as exemplary embodiments for illustrative purpose.

In the first asymmetry data mode 410, each data transmission cycle 411 comprises a first data transmission period 413, a second data transmission period 415, and a certain number of periods for other purposes. The first data transmission period 413 and the second data transmission period 415 do not overlap with each other, and the time length of the first data transmission period 413 is greater than the time length of the second data transmission period 415. The time length of the first data transmission period 413 may be 2 times, 2.5 times, 3 times, or more than 3 times the time length of the second data transmission period 415.

In the second asymmetry data mode 420, each data transmission cycle 421 comprises a first data transmission period 423, a second data transmission period 425, and a certain number of periods for other purposes. The first data transmission period 423 and the second data transmission period 425 do not overlap with each other, and the time length of the first data transmission period 423 is less than the time length of the second data transmission period 425. The time length of the second data transmission period 425 may be 2 times, 2.5 times, 3 times, or more than 3 times the time length of the first data transmission period 423.

In one embodiment, the inquirer-side circuit 110 and the respondent-side circuit 120 may operate in the first asymmetry data mode 410. In this situation, the transmitting circuit 113 of the inquirer-side circuit 110 transmits data to the respondent-side circuit 120 in the first data transmission period 413, but does not transmit data to the respondent-side circuit 120 in the second data transmission period 415. On the other hand, the transmitting circuit 123 of the respondent-side circuit 120 transmits data to the inquirer-side circuit 110 in the second data transmission period 415, but does not transmit data to transmits data to the inquirer-side circuit 110 in the first data transmission period 413.

In the first asymmetry data mode 410, in order to match the data transmission scheduling of the respondent-side circuit 120, the receiving circuit 114 of the inquirer-side circuit 110 receives data transmitted from the respondent-side circuit 120 in the second data transmission period 415, but does not receive data transmitted from the respondent-side circuit 120 in the first data transmission period 413. On the other hand, in order to match the data transmission scheduling of the inquirer-side circuit 110, the receiving circuit 114 of the respondent-side circuit 120 receives data transmitted from the inquirer-side circuit 110 in the first data transmission period 413, but does not receive data transmitted from the inquirer-side circuit 110 in the second data transmission period 415.

In other words, the data transmission period and the data reception period of the inquirer-side circuit 110 will be staggered and not overlap with each other. Similarly, the data transmission period and the data reception period of the respondent-side circuit 120 will be staggered and not overlap with each other.

In another embodiment, the inquirer-side circuit 110 and the respondent-side circuit 120 may operate in the second asymmetry data mode 420. In this situation, the transmitting circuit 113 of the inquirer-side circuit 110 transmit data to the respondent-side circuit 120 in the second data transmission period 425, but does not transmit data to the respondent-side circuit 120 in the first data transmission period 423. On the other hand, the transmitting circuit 123 of the respondent-side circuit 120 transmits data to the inquirer-side circuit 110 in the first data transmission period 423, but does not transmit data to the inquirer-side circuit 110 in the second data transmission period 425.

In the second asymmetry data mode 420, in order to the data transmission scheduling of the respondent-side circuit 120, the receiving circuit 114 of the inquirer-side circuit 110 receives data transmitted from the respondent-side circuit 120 in the first data transmission period 423, but does not receive data transmitted from the respondent-side circuit 120 in the second data transmission period 425. On the other hand, in order to match the data transmission scheduling of the inquirer-side circuit 110, the receiving circuit 114 of the respondent-side circuit 120 receives data transmitted from the inquirer-side circuit 110 in the second data transmission period 425, but does not receive data transmitted from the inquirer-side circuit 110 in the first data transmission period 423.

It can be appreciated from the foregoing descriptions that both of the aforementioned first asymmetry data mode 410 and second asymmetry data mode 420 are not the full duplex mode specified in the traditional automotive Ethernet communication protocol.

In the applications where the amount of data that the inquirer-side circuit 110 needs to transmit is greater than the amount of data that the respondent-side circuit 120 needs to transmit, the inquirer-side circuit 110 and the respondent-side circuit 120 may operate in the first asymmetry data mode 410 in the operation 310, so as to increase the data transmission efficiency.

On the contrary, in the applications where the amount of data that the respondent-side circuit 120 needs to transmit is greater than the amount of data that the inquirer-side circuit 110 needs to transmit, the inquirer-side circuit 110 and the respondent-side circuit 120 may operate in the second asymmetry data mode 420 in the operation 310, so as to increase the data transmission efficiency.

In operations, the inquirer-side circuit 110 and the respondent-side circuit 120 may dynamically switch between the first asymmetry data mode 410 and the second asymmetry data mode 420 when there is an obvious change in the data transmission volume of both sides.

In practical applications, the amount of data that needs to be transmitted between the inquirer-side circuit 110 and the respondent-side circuit 120 of the automotive Ethernet system 100 is often unequal and may even differ significantly. Therefore, if the inquirer-side circuit 110 determines that the respondent-side circuit 120 is capable of supporting the asymmetry data mode proposed in this disclosure by adopting the confirmation mechanism described in the flowchart of aforementioned FIG. 2 and FIG. 3, the automotive Ethernet system 100 can replace the traditional symmetry data mode with the asymmetry data mode proposed in this disclosure.

In this way, not only the data transmission efficiency between the inquirer-side circuit 110 and the respondent-side circuit 120 can be greatly increased, but also the bandwidth utilization efficiency between the inquirer-side circuit 110 and the respondent-side circuit 120 can be effectively improved.

In addition, as described previously, when the transmitting circuit 113 and the receiving circuit 114 of the inquirer-side circuit 110 operate simultaneously, it is required to utilize the echo cancellation circuit 117 to generate the echo cancellation signals in order to improve the correctness of signals received by the receiving circuit 114. Similarly, when the transmitting circuit 123 and the receiving circuit 124 of the respondent-side circuit 120 operate simultaneously, it is required to utilize the echo cancellation circuit 127 to generate the echo cancellation signals in order to improve the correctness of signals received by the receiving circuit 124.

However, it can be appreciated from the foregoing elaborations that when the inquirer-side circuit 110 and the respondent-side circuit 120 operate in the asymmetry data mode proposed in this disclosure (e.g., the aforementioned first asymmetry data mode 410 or the second asymmetry data mode 420), the transmitting circuit 113 and the receiving circuit 114 of the inquirer-side circuit 110 do not operate simultaneously, and similarly, the transmitting circuit 123 and the receiving circuit 124 of the respondent-side circuit 120 do not operate simultaneously.

Therefore, when the inquirer-side circuit 110 operates in the asymmetry data mode, the echo cancellation circuit 117 of the inquirer-side circuit 110 can be temporarily turned off to suspend the operation of the echo cancellation circuit 117. Similarly, when the respondent-side circuit 120 operates in the asymmetry data mode, the echo cancellation circuit 127 of the respondent-side circuit 120 can be temporarily turned off to suspend the operation of the echo cancellation circuit 127. As a result, the power consumption of the inquirer-side circuit 110 can be effectively reduced, and the power consumption of the respondent-side circuit 120 can also be effectively reduced.

Furthermore, since the operation of transmitting the asymmetry mode identification signal to the respondent-side circuit 120 conducted by the inquirer-side circuit 110 and the operation of transmitting the predetermined response signal to the inquirer-side circuit 110 conducted by the respondent-side circuit 120 are both performed after the inquirer-side circuit 110 and the respondent-side circuit 120 complete the link synchronization operation (or the auto-negotiation operation), it is obvious that the link synchronization operation (or the auto-negotiation operation) between the inquirer-side circuit 110 and the respondent-side circuit 120 will not be interfered. This approach can effectively avoid significantly increasing the overall control complexity of the automotive Ethernet system 100.

Apparently, the disclosed inquirer-side circuit 110 dynamically inspects whether the respondent-side circuit 120 supports the asymmetry data mode proposed by this disclosure, and adjusts the way of conducting data communication with the respondent-side circuit 120 according to different conditions of the respondent-side circuit 120. Such a mechanism enables the inquirer-side circuit 110 to have greater application flexibility as it can cooperate with different respondent-side circuits.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. An inquirer-side circuit, comprising:
   a hybrid circuit configured to conduct data communication with a respondent-side circuit through a medium dependent interface (MDI) circuit;
   a transmitting circuit coupled with the hybrid circuit and configured to generate and transmit a transmission signal to the hybrid circuit;
   a receiving circuit coupled with the hybrid circuit and configured to receive and parse a received signal transmitted from the hybrid circuit to generate a data signal;
   a processing circuit coupled with the receiving circuit and configured to process the data signal;
   a physical coding sublayer circuit coupled with the processing circuit and configured to conduct a physical coding operation, to control operations of the transmitting circuit; and
   an echo cancellation circuit coupled between the transmitting circuit and the receiving circuit and configured to generate an echo cancellation signal to the receiving circuit based on the transmission signal;
   wherein after the inquirer-side circuit and the respondent-side circuit complete a link synchronization operation or an auto-negotiation operation, if the receiving circuit receives a predetermined response signal from the respondent-side circuit before the inquirer-side circuit and the respondent-side circuit conduct a signal training operation, then the processing circuit determines that the respondent-side circuit is supporting an asymmetry data mode.

2. The inquirer-side circuit of claim 1, wherein the processing circuit controls the inquirer-side circuit to operate in the asymmetry data mode only if the processing circuit determines that the respondent-side circuit is supporting the asymmetry data mode.

3. The inquirer-side circuit of claim 1, wherein before the inquirer-side circuit operates in the asymmetry data mode, the processing circuit controls the inquirer-side circuit to conduct the signal training operation with the respondent-side circuit.

4. The inquirer-side circuit of claim 1, wherein when the inquirer-side circuit operates in the asymmetry data mode, the echo cancellation circuit suspends its operation.

5. The inquirer-side circuit of claim 1, wherein when the inquirer-side circuit operates in the asymmetry data mode, the transmitting circuit transmits data to the respondent-side circuit in a first data transmission period, and the receiving circuit receives data transmitted from the respondent-side circuit in a second data transmission period;
   wherein the first data transmission period and the second data transmission period do not overlap with each other, the transmitting circuit does not transmit data to the respondent-side circuit in the second data transmission period, and the receiving circuit does not receive data transmitted from the respondent-side circuit in the first data transmission period.

6. The inquirer-side circuit of claim 5, wherein the first data transmission period and the second data transmission period have different time lengths.

7. The inquirer-side circuit of claim 1, wherein after the inquirer-side circuit and the respondent-side circuit complete the link synchronization operation or the auto-negotiation operation, the physical coding sublayer circuit controls the transmitting circuit to generate an asymmetry mode identification signal representing that the inquirer-side circuit is supporting the asymmetry data mode, and to transmit the asymmetry mode identification signal to the respondent-side circuit through the hybrid circuit and the MDI circuit before the inquirer-side circuit and the respondent-side circuit conduct the signal training operation.

8. The inquirer-side circuit of claim 7, wherein after the inquirer-side circuit transmits the asymmetry mode identification signal to the respondent-side circuit, if the receiving circuit has received a predetermined quantity of signals from the respondent-side circuit, but has not yet received the predetermined response signal transmitted from the respondent-side circuit, then the processing circuit determines that the respondent-side circuit is unable to support the asymmetry data mode.

9. The inquirer-side circuit of claim 8, wherein after the processing circuit determines that the respondent-side circuit is unable to support the asymmetry data mode, the processing circuit controls the inquirer-side circuit to begin conducting the signal training operation with the respondent-side circuit, and after the inquirer-side circuit and the respondent-side circuit complete the signal training operation, the processing circuit controls the inquirer-side circuit to operate in a symmetric data mode.

\* \* \* \* \*